(12) United States Patent
Wezel et al.

(10) Patent No.: US 11,794,650 B2
(45) Date of Patent: *Oct. 24, 2023

(54) FOLDING JOINT FOR REAR VIEW DISPLAY DEVICE

(71) Applicant: SMR Patents S.à.r.l., Luxembourg (LU)

(72) Inventors: Christian Wezel, Stuttgart (DE); Alexandru Dobrete, Stuttgart (DE); Peter Hein, Stuttgart (DE); Andrea König, Stuttgart (DE); Arne Schmierer, Stuttgart (DE); Volker Erhart, Stuttgart (DE); Csaba Szilagyi, Stuttgart (DE); Hans-Dieter Pomparew, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 546 days.

This patent is subject to a terminal disclaimer.

(21) Appl. No.: 17/012,476

(22) Filed: Sep. 4, 2020

(65) Prior Publication Data

US 2020/0398756 A1 Dec. 24, 2020

Related U.S. Application Data

(63) Continuation-in-part of application No. 16/307,800, filed as application No. PCT/EP2017/064260 on Jun. 12, 2017, now Pat. No. 10,766,420.
(Continued)

(30) Foreign Application Priority Data

Jun. 10, 2016 (DE) .......................... 102016110748.4

(51) Int. Cl.
*E05D 11/10* (2006.01)
*B60R 1/076* (2006.01)
*F16C 11/10* (2006.01)

(52) U.S. Cl.
CPC .............. *B60R 1/076* (2013.01); *F16C 11/10* (2013.01); *E05D 11/10* (2013.01)

(58) Field of Classification Search
CPC ... E05D 11/10; E05D 11/1028; E05D 11/105; E05D 11/1057; E05D 11/1064;
(Continued)

(56) References Cited

U.S. PATENT DOCUMENTS 6,459,887 B2 * 10/2002 Okuda ................ H04M 1/0218
16/326
6,658,694 B2 * 12/2003 Wang .................... E05F 1/1223
16/284

(Continued)

FOREIGN PATENT DOCUMENTS

DE 69101270 T2 10/1994
DE 29611580 U1 12/1996
EP 0816610 A2 1/1998

OTHER PUBLICATIONS

International Search Report dated Aug. 25, 2017 of International application No. PCT/EP2017/064260.
(Continued)

*Primary Examiner* — Roberta S Delisle
(74) *Attorney, Agent, or Firm* — Jones Day

(57) ABSTRACT

A folding joint for attaching a rear view display device to a vehicle includes one or more hinge sections each of which is adapted to rotate relative to the vehicle, with each of the one or more hinge sections having a first end and a second end, and a biasing element comprising a spring, a coil, a wave spring, or other elastic member for biasing at least one of the one or more hinge sections in response to rotation of
(Continued)

the folding joint, with the biasing element biasing at least one of a spring biased cam section and a biased clamping bolt. An external rear view display device for a vehicle may include the folding joint, and a vehicle may include two external rear view display devices.

33 Claims, 15 Drawing Sheets

Related U.S. Application Data

(60) Provisional application No. 63/065,596, filed on Aug. 14, 2020.

(58) Field of Classification Search
CPC ............ E05D 11/1071; E05D 11/1085; E05F 1/1246; E05F 1/1253; E05F 5/08; E05Y 2900/50; B60R 1/076; B60R 1/12; B60R 2001/1253; F16C 11/10
USPC .......... 16/284, 286, 319, 325, 334, 335, 341
See application file for complete search history.

(56) References Cited

U.S. PATENT DOCUMENTS

| 7,203,996 | B2 | | 4/2007 | Linnenbrink et al. |
|---|---|---|---|---|
| 7,509,709 | B2 | * | 3/2009 | Chung ................. G06F 1/1616 |
| | | | | 16/319 |
| 8,701,249 | B2 | * | 4/2014 | Ahn .................... H04M 1/0216 |
| | | | | 16/326 |
| 10,766,420 | B2 | * | 9/2020 | Wezel ....................... B60R 1/12 |
| 2009/0126154 | A1 | * | 5/2009 | Lin ........................ G06F 1/1616 |
| | | | | 16/286 |
| 2013/0067688 | A1 | * | 3/2013 | Kim ................... E05D 11/1028 |
| | | | | 16/319 |
| 2014/0091123 | A1 | * | 4/2014 | Kim ...................... G02B 7/182 |
| | | | | 224/567 |

OTHER PUBLICATIONS

Written Opinion dated Aug. 25, 2017 of International application No. PCT/EP2017/064260.

* cited by examiner

FOLDING JOINT FOR REAR VIEW DISPLAY DEVICE

CROSS-REFERENCE TO RELATED ART

This application claims the benefit of priority to U.S. Provisional Patent Application No. 63/065,596, filed Aug. 14, 2020, and this application is a continuation-in-part of U.S. patent application Ser. No. 16/307,800, filed Dec. 6, 2018, which is a National Stage Entry of International Patent Application No. PCT/EP2017/064260, filed Jun. 12, 2017, which claims the benefit of foreign priority to German Patent Application No. DE 10 2016 110 748.4, filed Jun. 10, 2016, each of which is incorporated by reference in its entirety herein for all purposes.

BACKGROUND OF THE INVENTION

1. Field of the Invention

The present disclosure relates to a folding joint for attaching a rear view display device to a vehicle including a first hinge section and a second hinge section where the first and second hinge sections are adapted to be rotational relative to each other around an axis of rotation. In addition, the present disclosure relates to folding joints having bidirectional folding capability. A rear view display device for a vehicle including such folding joints and a vehicle including such rear view display devices are also described.

2. Related Art

In modern day vehicles, camera based systems are becoming increasingly popular. These vehicles typically include vision systems that have rear view display devices with cameras and/or conventional mirrors. For example, in camera based systems, the images of cameras on the left-hand side, right-hand side, the front and the back of the vehicle are shown to the driver, instead of, or in addition to conventional mirrors. The respective rear view display devices are usually attached to the vehicle using folding joints. Usually, rear view display devices, regardless of whether they include cameras or only conventional mirrors, are usually held in the deployed or locked position by the folding joint, while at the same time the folding joint enables forward folding and rearward folding of the rear view device to avoid damages to the folding joint and/or to the rear view display device upon impact of an external mechanical force. For example, during maneuvering the vehicle in constraint spaces, the rear view display device might touch another car or a wall exerting an external force onto the folding joint. Due to the external force, the folding joint might then be folded in the forward or rearward direction.

For example, a conventional folding joint is described by EP Patent No. 1 498 314 B1. Here, first and second hinge sections are interconnected where the first hinge section is mounted in a rotatable manner to the second hinge section. However, the overall height of the joint is fairly large making the shape of the folding joint rather bulky.

EP 3375665 discloses a bi-directional folding mechanism for an exterior mounted camera system. The folding mechanism is intended to protect the camera assembly in the event of a collision with the obstacle. The disclosed assembly consists of a first housing to store the camera system and a second housing system that connects to a vehicle. The first housing is pivotally connected to the second housing unit by means of a first pivot connection and a second pivot connection to define a first axis and second axis respectively.

DE102018116836 B4 discloses a rear-view device for a motor vehicle. The device comprises a first axis and a second axis. Wherein the device is pivotally connected about the first axis to enable rotation in a first direction, and is pivotally connected about the second axis to enable rotation in a second direction. This enables the rear-view device to fold upon impact with an external force, thus reducing damage to the device.

SUMMARY OF THE INVENTION

In an aspect, a folding joint for attaching a rear view display device to a vehicle includes one or more hinge sections each of which is adapted to rotate relative to the vehicle, with each of the one or more hinge sections comprising a first end and a second end, and a biasing element including a spring, a coil, a wave spring, or other elastic member for biasing at least one of the one or more hinge sections in response to rotation of the folding joint, with the biasing element biasing at least one of a spring biased cam section and a biased clamping bolt.

In another aspect, a folding joint for attaching a rear view display device to a vehicle includes a first hinge section and a second hinge section, the first and second hinge sections are adapted to be rotational relative to each other around an axis of rotation characterized by a spring biased cam section, which is adapted to interact with at least one detent or recessed surface for adjustably locking the rotational movement of the first and second hinge sections relative to each other, and the detent or recessed surface includes at least two depressions or recesses corresponding to locking positions for adjustably locking the rotational movement of the first and second hinge sections relative to each other.

Here, the term "first and second hinge section" can be used to refer to a base frame and to a case frame of a rear view display device, respectively.

The folding joint may include an elastic or biasing element, preferably a spring, in particular a coil spring or a wave spring, for spring biasing the spring biased cam section.

The second hinge section may include at least one slot for accommodating at least part of the first hinge section, or the first hinge section may include at least one slot for accommodating at least part of the second hinge section.

Each depression or recess for receiving a spring biased cam element of the spring biased cam section to thereby adjustably lock the rotational movement of the first and second hinge sections relative to each other may include an indent having edges inclined at an angle of approximately 45° for allowing the cam element to glide over the inclined edges of the depression to release the lock. The detent or recessed surface may include three depressions or recesses spaced at angular positions of approximately −60°, 0°, and 60° around the axis of rotation, where 0° marks a position where the first and second hinge sections are essentially not rotated relative to each other.

The first and second hinge sections may include plastic material, preferably a polyamide material.

The first hinge section may be adapted to hold the rear view display device with the rear view display device preferably including at least one reflective element and/or at least one camera module, and the second hinge section is adapted to attach to the vehicle.

A hinge pin at least in part coinciding with the axis of rotation may be adapted to rotatably connect the first and second hinge sections.

A spring biased clamping bolt may provide the spring biased cam section, preferably at one end thereof where one end of the spring biased clamping bolt is telescopically arranged.

The detent or recessed surface may be provided by the first hinge section or the second hinge section.

The hinge pin may include a guide pin, extending essentially perpendicularly from the hinge pin, and the spring biased clamping bolt may be arranged on the guide pin.

The term "hinge pin" can be used to refer to an essentially cylindrically object that can be used to interlink the first and second hinge sections. Also, the term "guide pin" can be used to refer to an essentially cylindrically object, where the guide pin can be attached to the circumference of the hinge pin.

The guide pin can be formed as an integral part with the hinge pin or can be attachable, preferably screwable, to the hinge pin where, preferably, the hinge pin and/or the guide pin include metal material.

It is proposed that the first hinge section includes a first opening, preferably a through-hole, aligned essentially with the axis of rotation where the first opening is adapted to accommodate at least part of the hinge pin; and a second opening extending essentially perpendicularly from the first opening in the direction of the second hinge section to accommodate at least part of the hinge pin.

The one end of the spring biased clamping bolt can be telescopically arranged on the guide pin so that at least part of the guide pin can be moved relative to the hinge pin.

The elastic element can be at least partly arranged around the guide pin.

The spring biased cam section can have at least one cam element, preferably a cam element having a protrusion and edges inclined at an angle of approximately 45°, and/or the cam section can be disposed on an end of the spring biased clamping bolt that is located opposite the end of the spring biased clamping bolt which is arranged on the guide pin.

The second hinge section can include a receiving opening, preferably a through hole, aligned essentially with the axis of rotation, for receiving at least part of the hinge pin to rotatably connect the second hinge section to the first hinge section, preferably the second hinge section including a recess around the receiving opening for at least partially enclosing a cap arranged on one end of the hinge pin.

The second hinge section can include at least one detent surface extending essentially radially in the slot of the second hinge section where the detent surface extends at least in part around the axis of rotation.

The spring biased clamping bolt may include the cam section with at least one cam at one end, and the spring of the elastic element is arranged around a part of the spring biased clamping bolt adapted to move said one end.

The spring biased clamping bolt can at least partly be moved within a channel provided by the first or second hinge section against the force of the elastic element, with the detent or recessed surface being provided by the second or first section, respectively.

A first, second, and third plate may be mounted on the hinge pin, preferably concentrically around the hinge pin, where the first plate provides the detent or recessed surface, and the second plate provides the spring biased cam section.

The spring of the elastic element may be arranged between the second plate and a third plate, with the third plate being arranged concentrically around the hinge pin and/or being fixed relative to the hinge pin and/or being provided as a cap.

In another aspect, a rear view display device for a vehicle, preferably for a motor vehicle, may include at least one folding joint.

In yet another aspect, a vehicle may include at least one rear view display device.

It has been advantageously found that the folding joint can be realized with a very flat design, which neither obstructs the driver's view nor obstructs the viewing angle of the rear view display device that is attached to it. Also, using such a folding joint does not unnecessarily adversely affect the vehicles drag coefficient.

For example, it has been found that a spring biased cam section having just one cam element is sufficient to rotationally lock two sections of the folding joint relative to each other.

A wave spring has been found to be advantageous for the spring biasing due to its compact and strong character. Further, the force that is required to release the lock can be easily adjusted by using elastic elements for spring biasing that have different spring constants. A wave spring, as described, is preferred but the folding joint is not limited to include such a wave spring.

By utilizing a guide pin including a spring biased clamping bolt attached to the hinge pin, separate functionalities can be combined into one component that are realized in the prior art folding joint with separate components that cannot be combined into one component.

A simple structure may be provided by a spring biased clamping bolt which can move within a channel provided by one of the hinge sections to lock or unlock the other hinge section relative to the one hinge section against the force of a spring.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
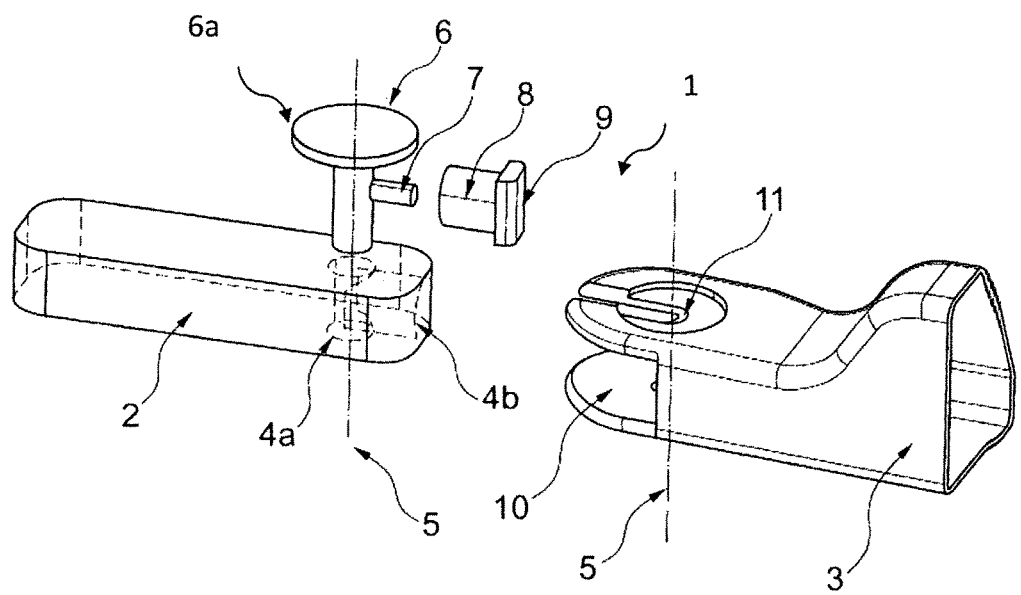
FIG. 1 shows an exploded view of an example of a folding joint with a first and a second hinge section.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

FIG. 1 shows a folding joint 1 according to a first example for attaching a rear view display device to a vehicle with a first hinge section 2 and a second hinge section 3. The first hinge section 2 can be adapted to hold a rear view display device for a vehicle, which might be, for example, a rear view mirror, a camera, or a combination of both. The second hinge section 3 can be adapted to attach to the vehicle. For example, the second hinge section 3 can be adapted to attach to front doors of the vehicle at a location where traditionally rear view mirrors are attached to.

The first hinge section 2 may be essentially elongated and may include a first opening 4a for allowing a hinge pin 6 to be inserted. As illustrated in FIG. 1, the first opening 4a may be aligned with the axis of rotation 5. In the shown example, the opening 4a is shown as a through-hole. The skilled person, however, would know that the opening 4a could just partly extend through the material of the first hinge section 2. Also, as shown in FIG. 1, the first hinge section 2 may include a second opening 4b that extends perpendicularly from the first opening 4a in the direction of the second hinge section 3.

According to FIG. 1, the hinge pin 6 includes an essentially cylindrical body and a flat cap 6a on one of its ends so that the hinge pin 6 can be kept in the first opening 4a. When installed, a guide pin 7 that extends perpendicularly from the hinge pin 6 may be located in the second opening 4b. The skilled person would know that there are various possibilities for inserting the guide pin 7. For example, the first hinge section 2 could include a corresponding slot opening, or the guide pin 7 could be attached to the hinge pin 6, once the hinge pin 6 is mounted in the opening 4a.

FIG. 1 also illustrates a spring biased clamping bolt 9 that can be mounted on the guide pin 7. The skilled person would know that this could be done, for example, telescopically so that the clamping bolt 9 can move relative to the guide pin 7. When mounted, the clamping bolt 9 may be kept pushed away from the guide pin 7 using an elastic element 8, and can be moved towards the hinge pin 6 against the force of the elastic element 8. The skilled person would know that the elastic element 8 could be a helical coil made of spring steel that could be arranged around the guide pin 7 or could be any other elastic object capable of storing mechanical energy. The clamping bolt 9 may include a folding geometry that is adapted to interact with at least one detent surface of the second hinge section 3. In the example that is shown in FIG. 1, the clamping bolt 9 may include a cam section having one cam element with edges having an angle of approximately 45° that can be pressed by means of the elastic element 8 in a correspondingly shaped depression in the detent surface of the second hinge section 3 and can keep the first hinge section 2 and the second hinge section 3 rotationally locked relative to each other. However, the skilled person would know that in another example, the detent surface may be arranged in the second hinge section and may include a cam section. The first hinge section may include a correspondingly shaped geometry for rotationally locking the two sections relative to each other.

FIG. 1 also shows that the second hinge section 3 includes a slot 10 for accommodating at least part of the first hinge section 2 so that the axis of rotation 5 extends through the first 2 and the second 3 hinge sections when assembled. The second hinge section 3 may also include a recess 11 in which the cap 6a of the hinge pin 6 can be kept when both the first 2 and the second 3 hinge sections are mounted to keep them fixated relative to each other. Also, the second hinge section 3 may include a through-hole 3a where the hinge pin 6 can extend through. Referring to FIG. 1, another slot for the hinge pin 6 may extend into the recess 11 which can be used for attaching and removing the first and second hinge sections 2, 3.

Figure 2:
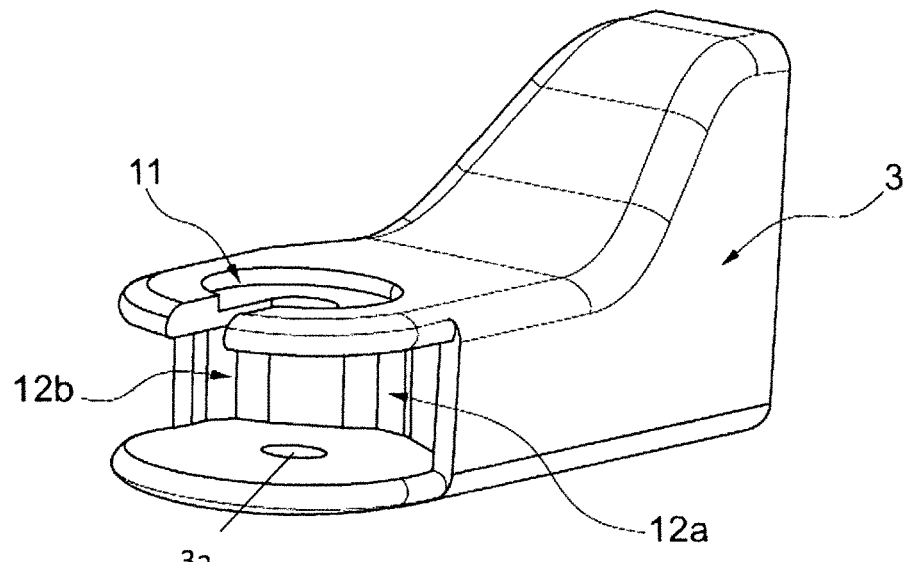
FIG. 2 shows a perspective view of an example of the second hinge section of the folding joint of FIG. 1.

FIG. 2 illustrates a schematic view of the second hinge section 3. The second hinge section 3 corresponds to the hinge section 3 that is shown in FIG. 1. In FIG. 2, the detent surface in the second hinge section 3 may be located essentially radially around the axis of rotation. As illustrated in FIG. 2, the detent surface may include a first depression 12a including a geometry where the cam element of the clamping bolt (not shown in figure) can be pushed in. FIG. 2 also illustrates that the first depression 12a includes edges with an angle of approximately 45°. During operation of the folding joint 1, the cam element of the clamping bolt 9 may be held in the first depression 12a using the elastic element. If either of the two hinge sections 2, 3 is rotated relative to the other section using an external force that is sufficiently high, the clamping bolt 9 can be moved towards the hinge pin 6 against the force of the elastic element 8 while the cam section of the clamping bolt 9 glides over the inclined edges of the first depression 12a to release the connection. Afterwards, the first and the second hinge sections 2, 3 can be moved essentially freely relative to one another while the clamping bolt 9 glides along a section of the curved detent surface. In the shown example, the detent surface includes a second depression 12b that is radially spaced from the first depression 12a.

Figure 3:
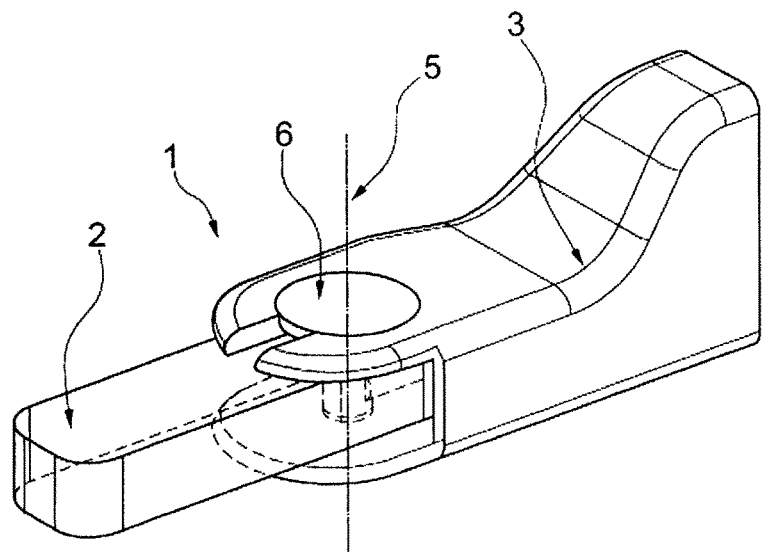
FIG. 3 shows a perspective view of an example of the assembled folding joint of FIG. 1.

FIG. 3 shows a schematic view of the assembled folding joint 1. Referring to FIG. 3, the hinge pin 6 may extend along the axis of rotation 5. During operation, the rear view display device on the end of the first hinge section 2 could be rotated relative to the vehicle around an axis of rotation 5. Also, by using the folding joint 1, the position of the rear view display device could be locked in positions where the cam section of the clamping bolt is held in a corresponding depression. As described above, the lock can be released when the second hinge section 2 is moved with a force that is sufficiently high enough, i.e. the force depends on the force of the elastic element biasing the clamping bolt, relative to the vehicle.

Figure 4:
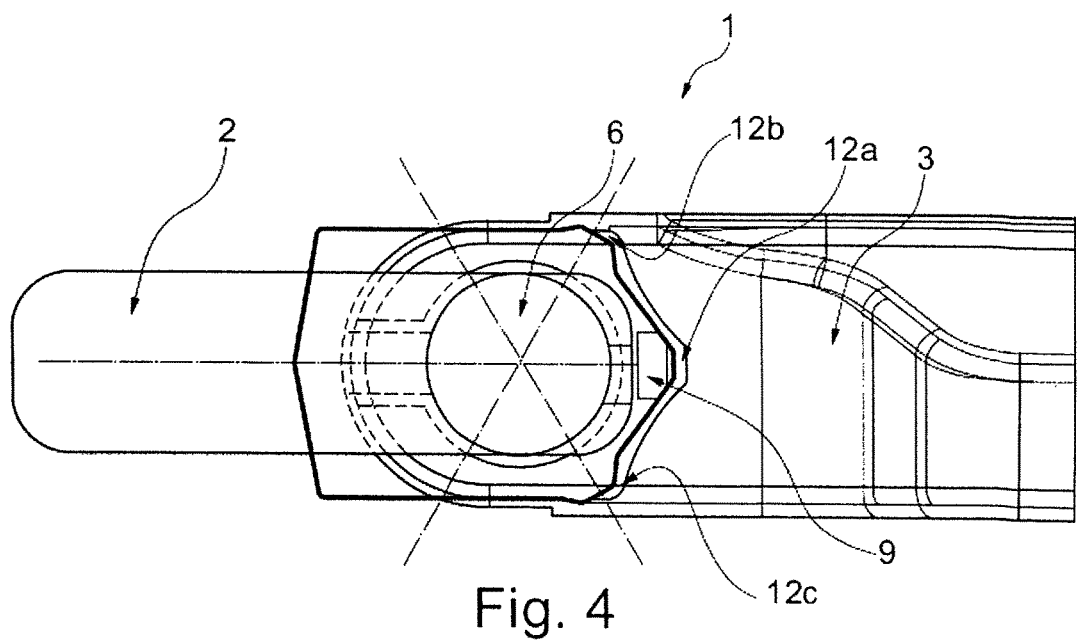
FIG. 4 shows a transparent top view of an example of the assembled folding joint of FIG. 3.

FIG. 4 shows a transparent top view of an assembled folding joint 1 according to an example of the invention. The folding joint 1 that is shown in FIG. 4 could be the folding joint 1 that is shown in FIG. 3. Referring to FIG. 4, the detent surface may include a first depression 12a, a second depression 12b, and a third depression 12c. Accordingly, the first hinge section 2 can be locked in three rotational positions relative to the second hinge section 3. The three locking positions may be located at rotation angles of −60°, 0°, and 60°. However, other locking positions may be used for example at least −60°, at least 0°, at least 60°, at most −60°, at most 0°, and at most 60°. In the shown example, the clamping bolt 9 may be located in the first depression 12a. However, the skilled person would know that depending on the application of the folding joint 1, the locking positions could be also arranged in different locations, and/or more or less locking positions could be realized.

Figure 5:
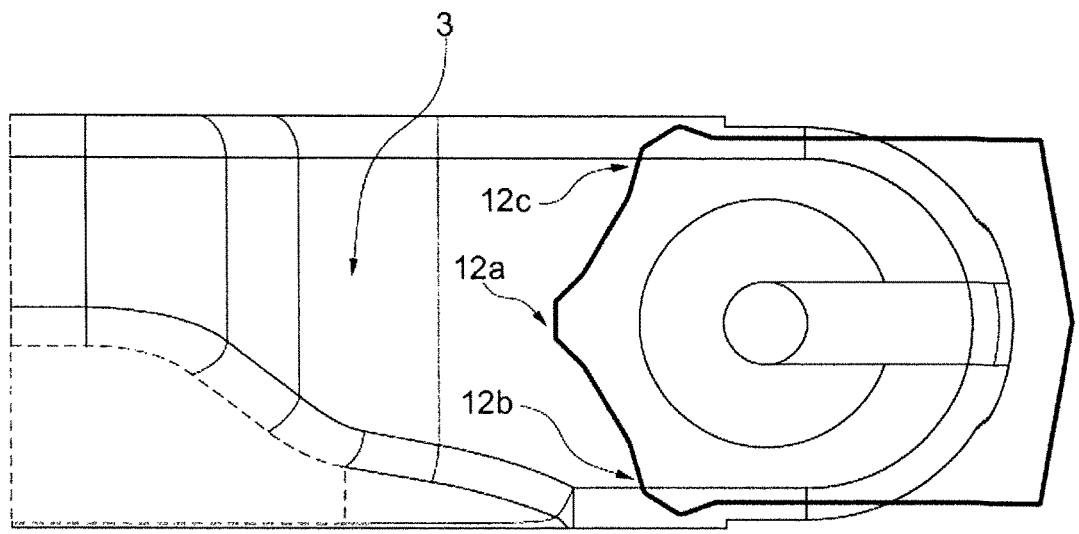
FIG. 5 shows a top view of an example of the second hinge section of FIG. 2.

The top view of the second hinge section 3 of FIG. 5 shows the first depression 12a, the second depression 12b, and the third depression 12c highlighted by means of a black line.

Figure 6:
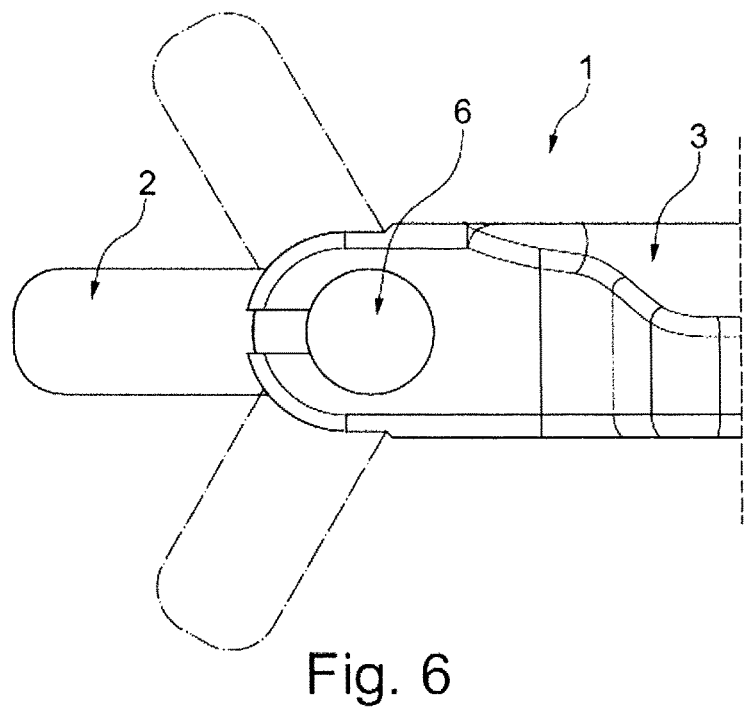
FIG. 6 shows a top view of an example of the assembled folding joint of FIG. 4 indicating different locking positions.

FIG. 6 shows a top view of an assembled folding joint 1 according to an example of the invention indicating different locking positions. The folding joint 1 that is shown in FIG. 6 could be the folding joint that is shown in one of the previous figures. Referring to FIG. 6, broken lines illustrate that the first hinge section 2 could be locked in three rotational positions relative to the second hinge section 3. The three locking positions may be located in the shown example at rotation angles of −60°, 0°, and 60°, or other positions as described above.

Figure 7:
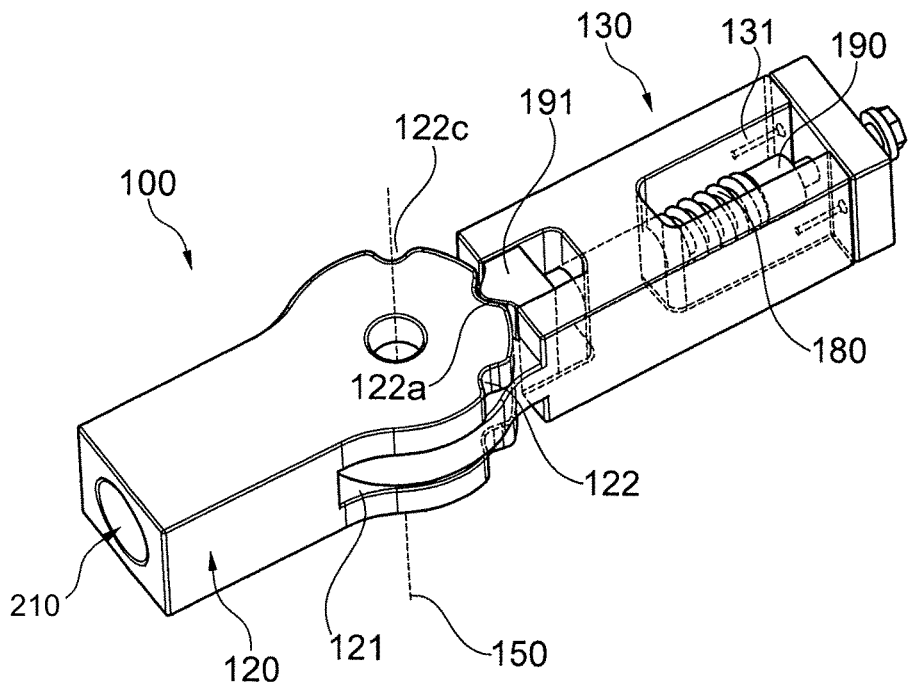
FIG. 7 shows a perspective view of an example of a folding joint with a first and a second hinge section.
Figure 8:
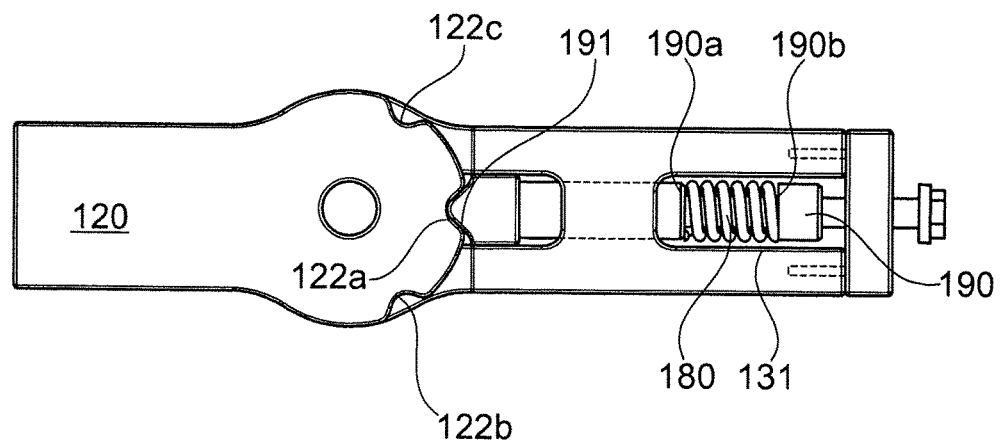
FIG. 8 shows a top view of an example of the folding joint of FIG. 7.

FIGS. 7 and 8 show a folding joint 100 according to another example of the invention for attaching a rear view display device to a vehicle with a first hinge section 120 and a second hinge section 130. The first hinge section 120 can be adapted to hold a rear view display device for a vehicle, for example, a camera module 210. The second hinge section 130 can be adapted to attach to the vehicle.

The first hinge section 120 is essentially elongated and may include a slot 121 for partially inserting the second hinge portion 130 such that both hinge sections 120, 130 can be rotated around an axis of rotation 150. In addition, the first hinge section 120 may be provided with a first, second and third recess 122a, 122b, 122c defining three locking positions of the first hinge section 120 relative to the second hinge section 130, namely located at rotation angles of −60°, 0°, and 60°, with the 0° locking position being shown in FIGS. 7 and 8. However, other locking positions may be used for example at least −60°, at least 0°, at least 60°, at most −60°, at most 0°, and at most 60°.

Also shown in FIGS. 7 and 8 is a spring biased clamping bolt 190 with a cam 191 for engaging one of the recesses 122a, 122b, 122c of the first hinge section 120. The cam 191 is provided by a slide of the clamping bolt 190 which can move within a channel 131 of the second hinge section 130 against the force of a coil spring 180. The spring 180 may be arranged around a portion of the clamping bolt 190 between two shoulder 190a, 190a thereof. The skilled person would know that this could be done telescopically, for example, so that the cam 191 can move relative to the first hinge section 120.

During operation of the folding joint 100, the cam 191 of the clamping bolt 190 may be held in the first recess 122a using the coil spring 180. If either of the two hinge sections 120, 130 are rotated relative to the other section using an external force that is sufficiently high, the clamping bolt 190 can be moved against the force of the coil spring 180, while the cam 191 glides over the inclined edges of the first recess 122a to release the connection. Afterwards, the first and the second hinge sections 120, 130 can be moved essentially freely relative to one another, while the cam 191 glides along a section of the curved surface of the first hinge section 120 until it enters into either the second or the third recess 122b, 122c depending on the direction of rotation.

The folding joint 100 allows reduction of the overall height of a folding mechanism to lower than 30 mm leading to a space saving which is an advantage when providing the first hinge section 120 as a camera pod, as illustrated in FIG. 7.

Figure 9:
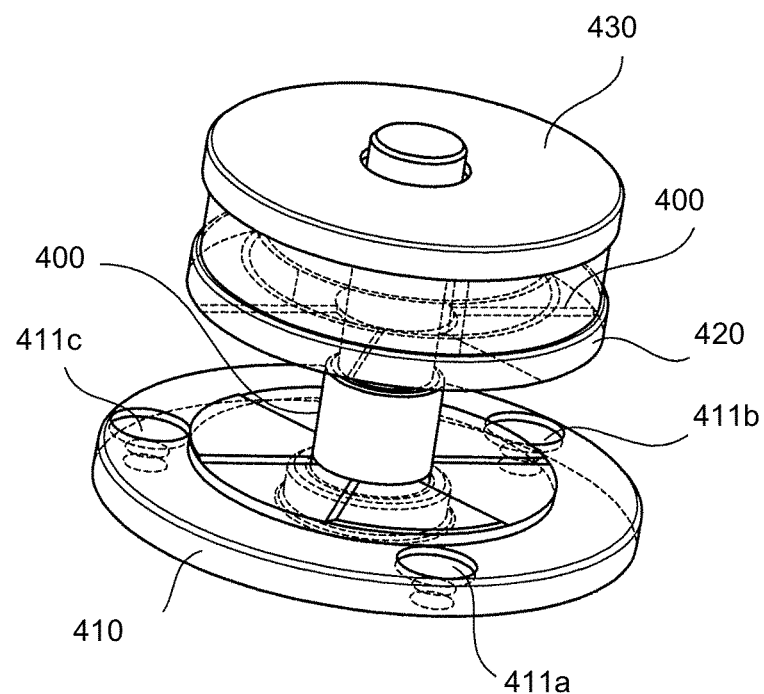
FIG. 9 shows an exploded view of an example of a hinge pin of a folding joint carrying a wave spring.
Figure 10:
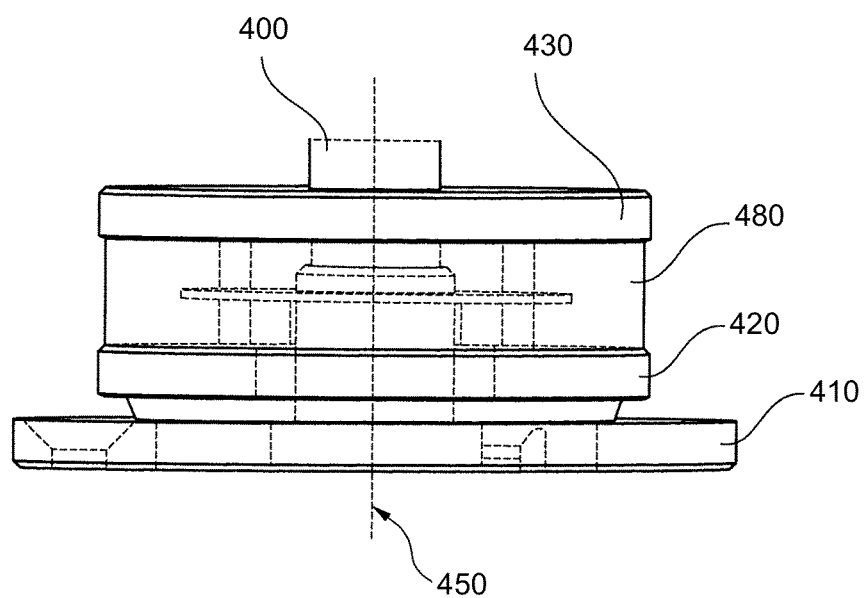
FIG. 10 shows a side view of an example of the assembled hinge pin with the wave spring of FIG. 9.

FIGS. 9 and 10 show a hinge pin 400 of a folding joint according to a third example of the invention for attaching a first hinge section to a second hinge section with three locking positions relative to each other. The skilled person will understand that the number of locking positions can be adapted to special needs.

In this example, the hinge pin 400 is carrying a first, a second, and a third plate 410, 420, 430 and a wave spring 480. The first plate 410 and the third plate 430 can be fixed relative to the hinge pin 400 whereas the second plate 420 may be biased against the first plate 410 by the wave spring 480 which is placed between the second and the third plate 420, 430 in the example shown in FIGS. 9 and 10. Referring to FIG. 9, the first plate 410 may be provided with three recesses 411*a*, 411*b*, 411*c* located at rotation angles of −60°, 0°, and 60° around an axis of rotation 450 shown in FIG. 10, whereas the second plate 420 may be provided with three corresponding cams (not shown) to engage with said recess 411*a*, 411*b*, 411*c*, as illustrated in FIG. 10.

In order to break the connection between the first and the second plate 410, 420 *a* moment of force has to be applied which slides the cams out of the recesses 411*a*, 411*b*, 411*c* against the force of the wave spring 800 such that the hinge sections can be rotated until the cams enter the next recesses 411*a*, 411*b*, 411*c*.

For example, a wave spring has several advantages over a coil spring in that the required axial space can be reduced by up to 50% and a load in an axial direction can be transferred 100%. While the wave spring, as described, is an example, the folding joint is not limited to include including a wave spring.

Figure 11:
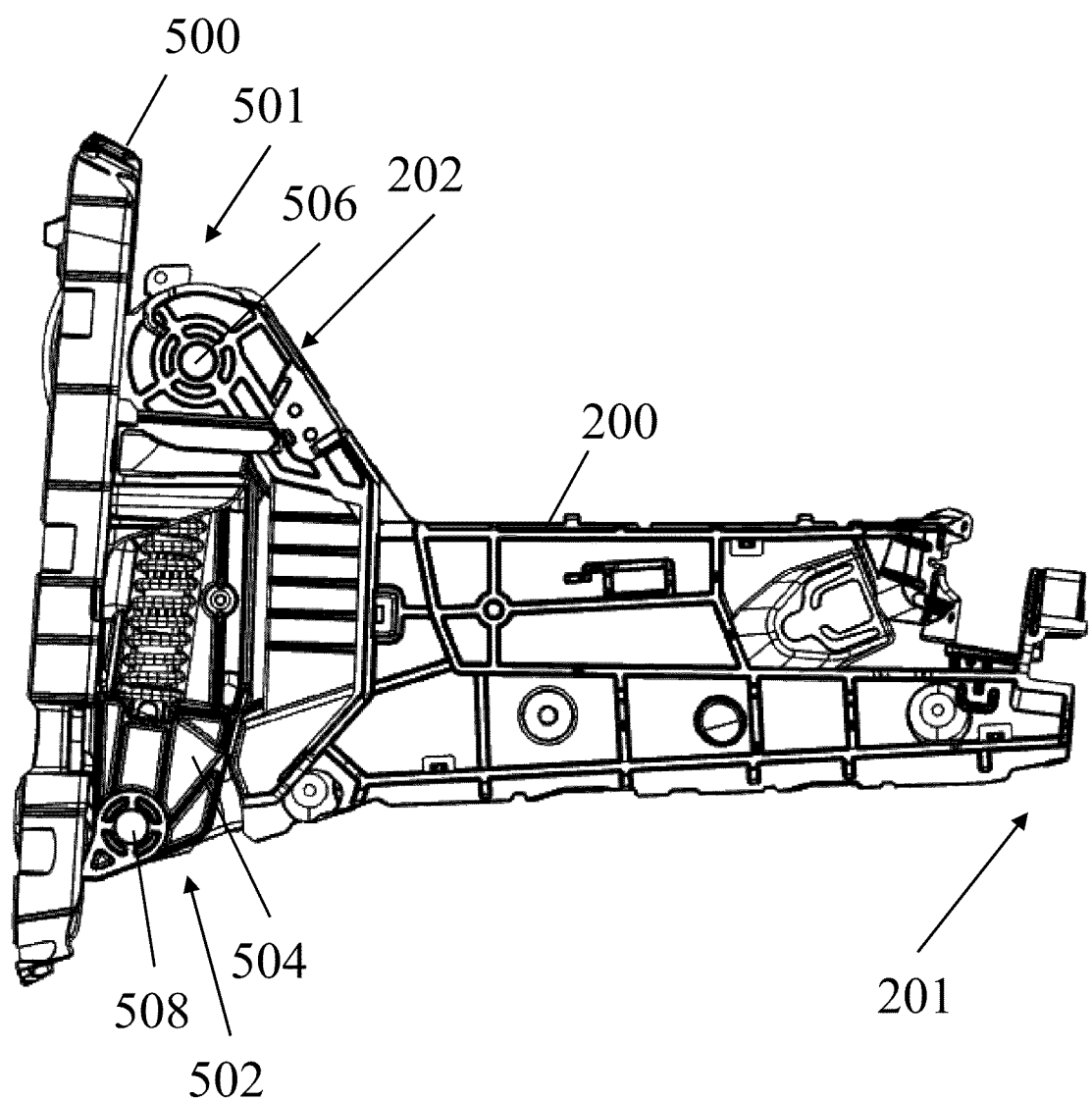
FIG. 11 depicts a top perspective view of another example of a folding joint with a bidirectional folding capability.
Figure 12:
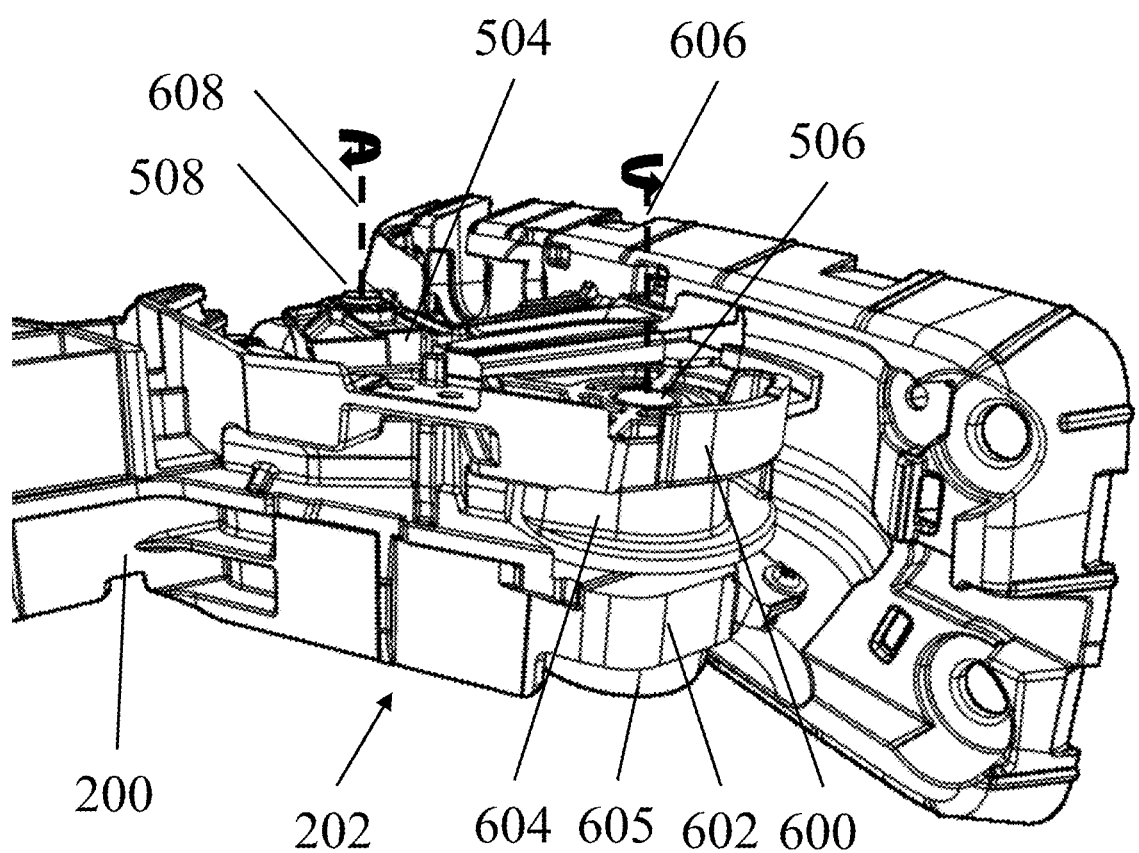
FIG. 12 depicts an isometric view of the folding joint of FIG. 11 emphasizing the connection at the first axis.
Figure 13:
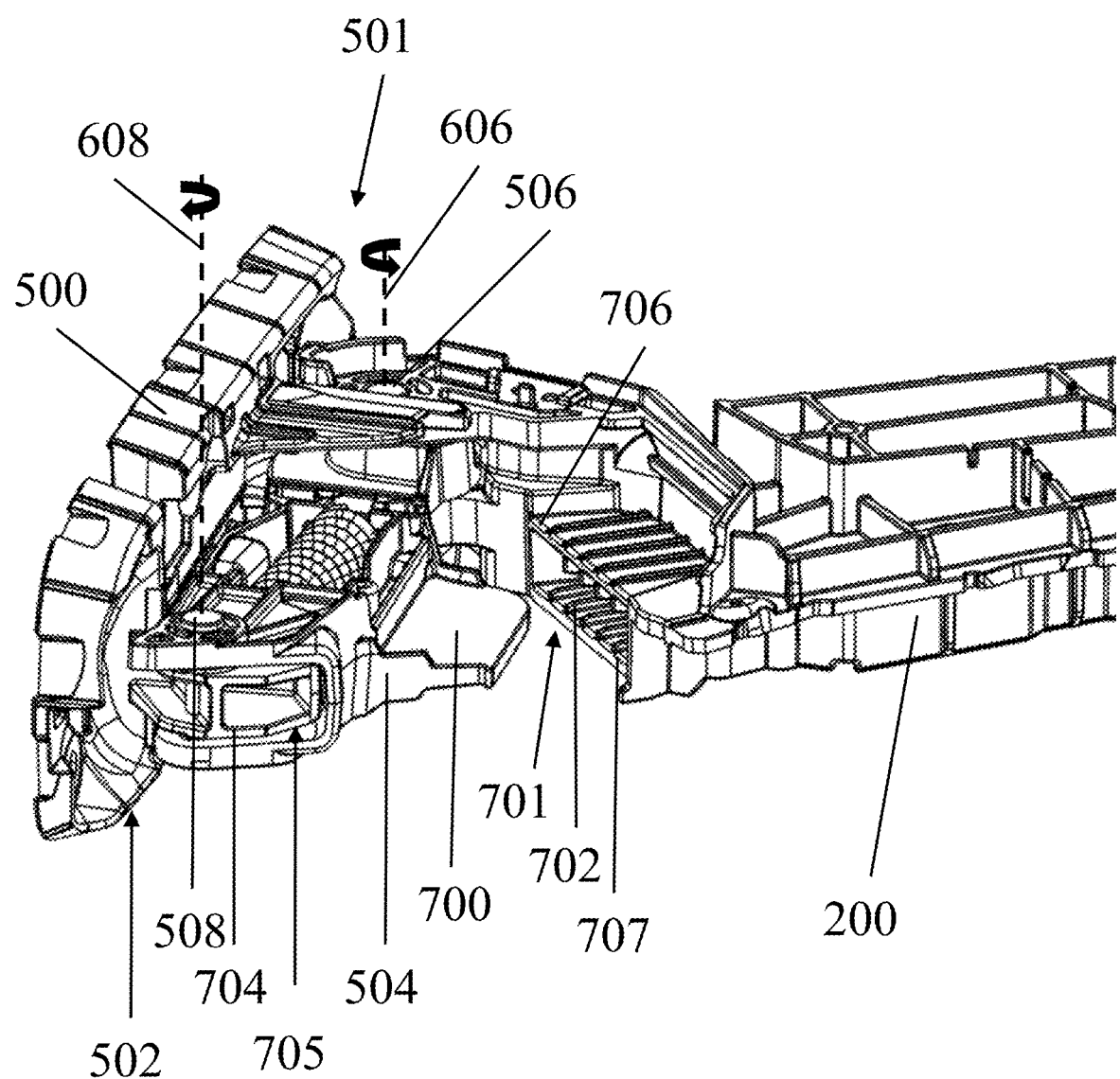
FIG. 13 depicts an isometric view of the folding joint of FIG. 11 with a rotation about the first axis.
Figure 14:
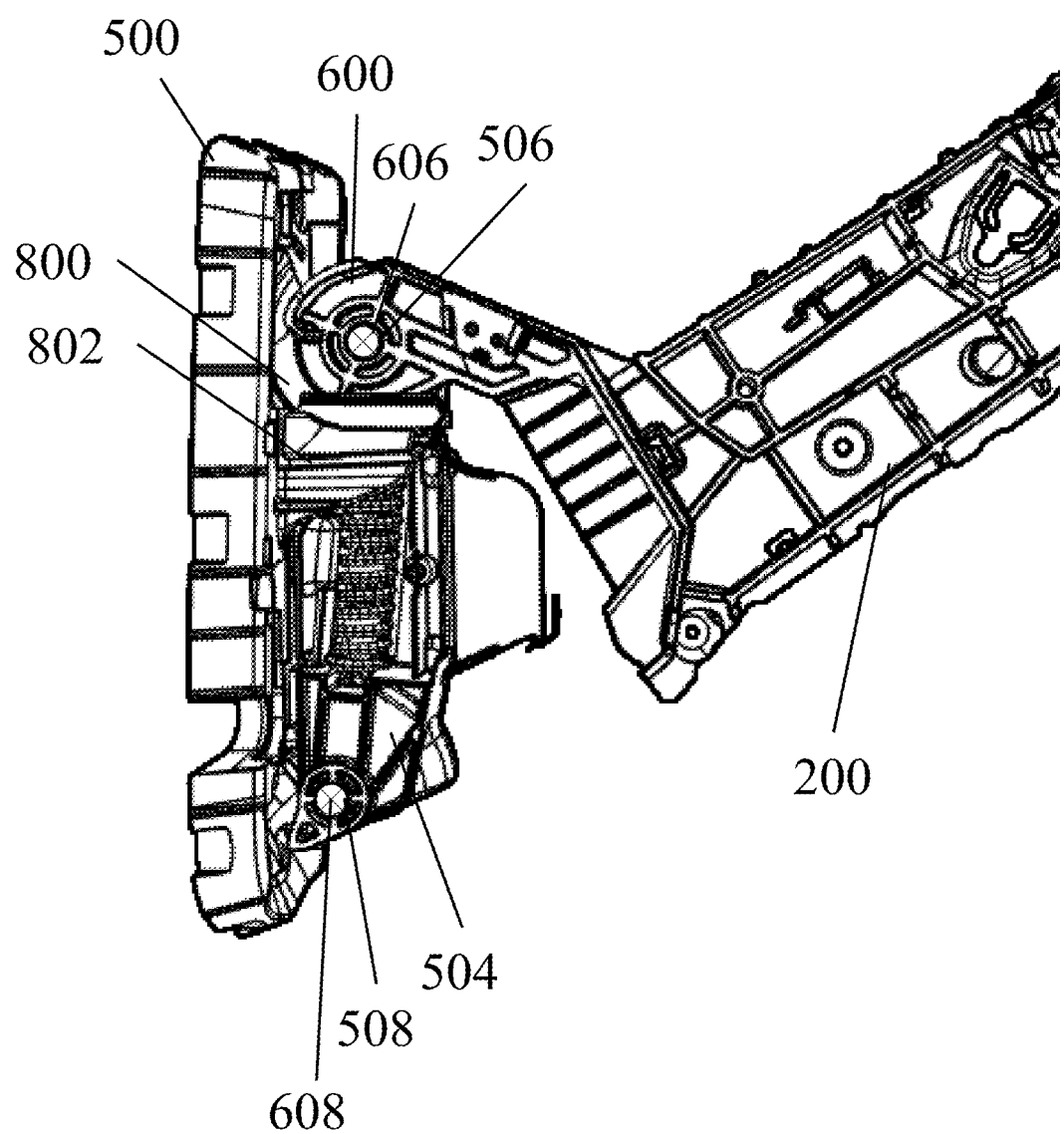
FIG. 14 depicts a top perspective view of the folding joint of FIG. 11 with a rotation about the first axis.

FIG. 11 illustrates a top view of another example of a folding joint with a bidirectional folding capability. The distal arm end 201 can be adapted to hold a rear view display device for a vehicle, which might be, for example, a rear view mirror, a camera, or a combination of both. The proximal arm end 202 can be adapted to attach to a vehicle. The proximal arm end 202 of the arm 200 is pivotably coupled at a first end 501 of an intermediate attachment 504 via a first pin 506 forming a first axis 606, shown in FIG. 12. As shown in FIG. 12, the arm 200 is pivotable about the first axis 606 between zero degrees and 90 degrees, with zero degrees being the first position. As shown in FIGS. 13 and 14, the arm 200 pivots counter-clockwise about the first axis 606 to fold the arm 200 forward from the first position to a second position, shown in FIG. 13, and pivots clockwise to return it to the first position shown in FIG. 11. The second position may be located anywhere between 0 degrees and 90 degrees. The pivot direction is relative and can be altered.

Figure 15:
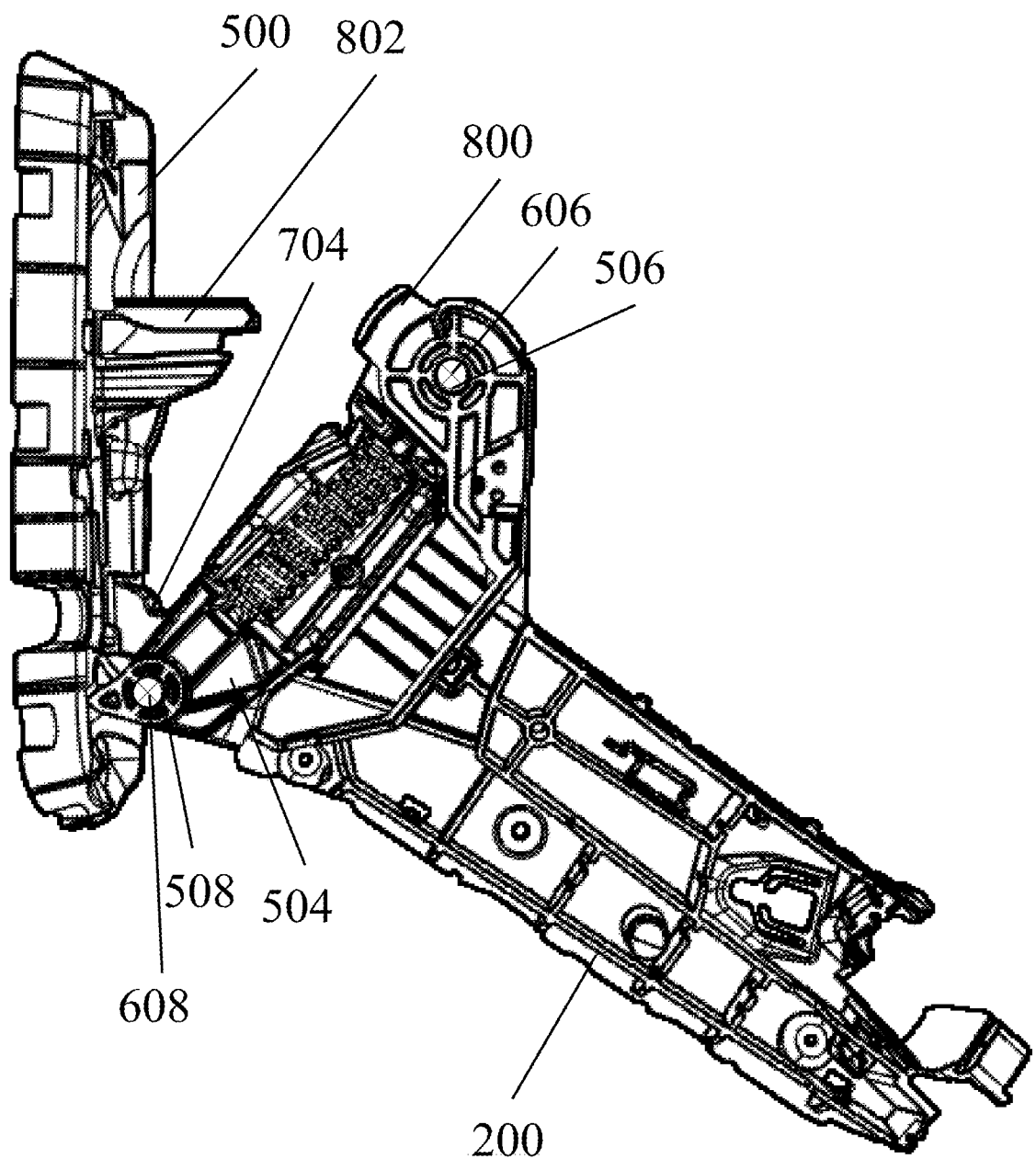
FIG. 15 depicts a top perspective view of the folding joint of FIG. 11 with a rotation about the second axis.

The intermediate attachment 504 is pivotably coupled to a base 500 at a second end 502 of the intermediate attachment 504 via a second pin 508 to form a second axis 608, as shown in FIG. 12. The intermediate attachment 504, along with the coupled arm 200, is able to pivot about the second axis 608 between zero degrees and 90 degrees. FIG. 15 illustrates the intermediate attachment 504 pivoting clockwise to fold the arm 200 backward from the first position to a third position and pivots counter-clockwise to return the intermediate attachment 504 to the first position as shown in FIG. 11. The third position may be anywhere between 0 degrees and 90 degrees. The pivot direction is relative and can be altered. The folding joint illustrated in this example is configured to be mounted on the left side of a vehicle. However, the present disclosure may be modified to accommodate mounting to the right side or other location on a vehicle.

FIG. 12 depicts an isometric view of the folding joint emphasizing the connection at the first axis 606. At the proximal arm end 202 of the arm 200 there is a first connection member 600 and a second connection member 602. At the first end 501 (shown in FIG. 11) of the intermediate attachment 504 there is a first coupling member 604 and a second coupling member 605. The first connection member 600 and second connection member 602 of the arm 200 are pivotably connected to the first coupling member 604 and the second coupling member 605 of the intermediate attachment 504 via the first pin 506. In this form, the first coupling member 604 and the second coupling member 605 of the intermediate attachment 504 are operably interleaved with the first connection member 600 and the second connection member 602. The first coupling member 604 of the intermediate attachment 504 is positioned between the first connection member 600 and the second connection member 602 of the arm 200. The second connection member 602 of the arm 200 then fits between the first coupling member 604 and the second coupling member 605 of the intermediate attachment 504. In other variations, the coupling members 604, 605 and the connection members 600, 602 may be operably coupled in other known configurations to create a pivot joint. The first connection member 600, the second connection member 602, the first coupling member 604, and the second coupling member 605 all contain an aperture (not shown), which when axially aligned enables the insertion of the first pin 506 through all members 600, 602, 604, 605, allowing the arm 200 to be pivotably coupled to the intermediate attachment 504 and form the first axis 606.

As illustrated in FIGS. 13 and 14, when the arm 200 is rotated in the counter-clockwise direction, it is able to fold forward from the first position to the second position, and returns to the first position when subsequently rotated in the clockwise direction. As illustrated in FIG. 15, the intermediate attachment 504 and the attached arm 200 are able to fold backward from the first position to the third position when rotated clockwise about the second axis 608, and are able to return to the first position when subsequently rotated in the counter-clockwise direction. As previously stated, these clockwise and counter-clockwise directions are relative to the orientation of the folding joint system and can be modified to accommodate other mounting configurations.

FIG. 13 illustrates an isometric view of the folding joint in a forward folded position achieved by rotating the arm 200 about the first axis 606. The intermediate attachment 504 includes a first protruding member 700 located between the first end 501 and the second end 502. When the arm 200 is in the active position, the first protruding member 700 is received by a first receiving cavity 701 in the arm 200. The first receiving cavity 701 contains at least one ribbing member 702. In this form, FIG. 13 depicts five ribbing members 702 located on a top surface 706 and bottom surface 707 that protrude into the first receiving cavity 701. In alternate variations, there may be fewer or more of the ribbing members 702 than depicted. Further, in other variations the ribbing members 702 may extend from the first protruding member 700 rather than from the first receiving cavity 701, or may be located on both the first protruding member 700 and the first receiving cavity 701. When the arm 200 is in the first position the first protruding member 700 is received by the first receiving cavity 701. This enables the ribbing members 702 protruding from the inside of the top surface 706 and the bottom surface 707 of the first receiving cavity 701 to engage the first protruding member 700. As the system, in particular at the distal arm end 201, encounters vibrations or forces while in the first position, the interaction between the ribbing members 702, the first receiving cavity 701, and the first protruding member 700 facilitates the transfer of the vibrations or forces from the arm 200 through the intermediate attachment 504, to the base 500. FIG. 13 illustrates the at least one ribbing member 702 in a disengaged position from the first protruding member 700.

The intermediate attachment 504 includes a second receiving cavity 705 located at the second end 502 of the intermediate attachment 504. The second receiving cavity 705 is configured to receive a second protruding member 704 which extends from the base 500 and can be best seen in FIGS. 15, 19 and 20. The second protruding member 704 and the second receiving cavity 705 contain apertures, which when axially aligned receive the second pin 508, thus pivotably coupling the intermediate attachment 504 to the base 500 and forming the second axis 608. This interaction between the second protruding member 704 and the second receiving cavity 705 enables vibrations and forces from the intermediate attachment 504 to transfer to the base 500, improving the overall stability of the assembly.

FIG. 14 illustrates a top view of the assembly in a forward folded position achieved by rotating the arm 200 about the first axis 606. The arm 200 includes a bracing member 800 which extends from the first connection member 600. As the arm pivots about the first axis 606 the bracing member 800 engages a support surface 802 which extends from the base 500. This connection between the bracing member 800 and the support surface 802 enables downward forces and moments applied to the arm 200 to transfer from the arm 200 to the base 500.

FIG. 15 depicts a top view of the assembly in the third position achieved by rotating the intermediate attachment 504 and attached arm 200 about the second axis 608. As forces are applied to the arm 200 and/or the intermediate attachment 504, the forces are transferred to the base 500 via the connection at the second axis 608. FIG. 15 also illustrates the disengaged bracing member 800 and the support surface 802 that extends from the base 500.

Figure 16:
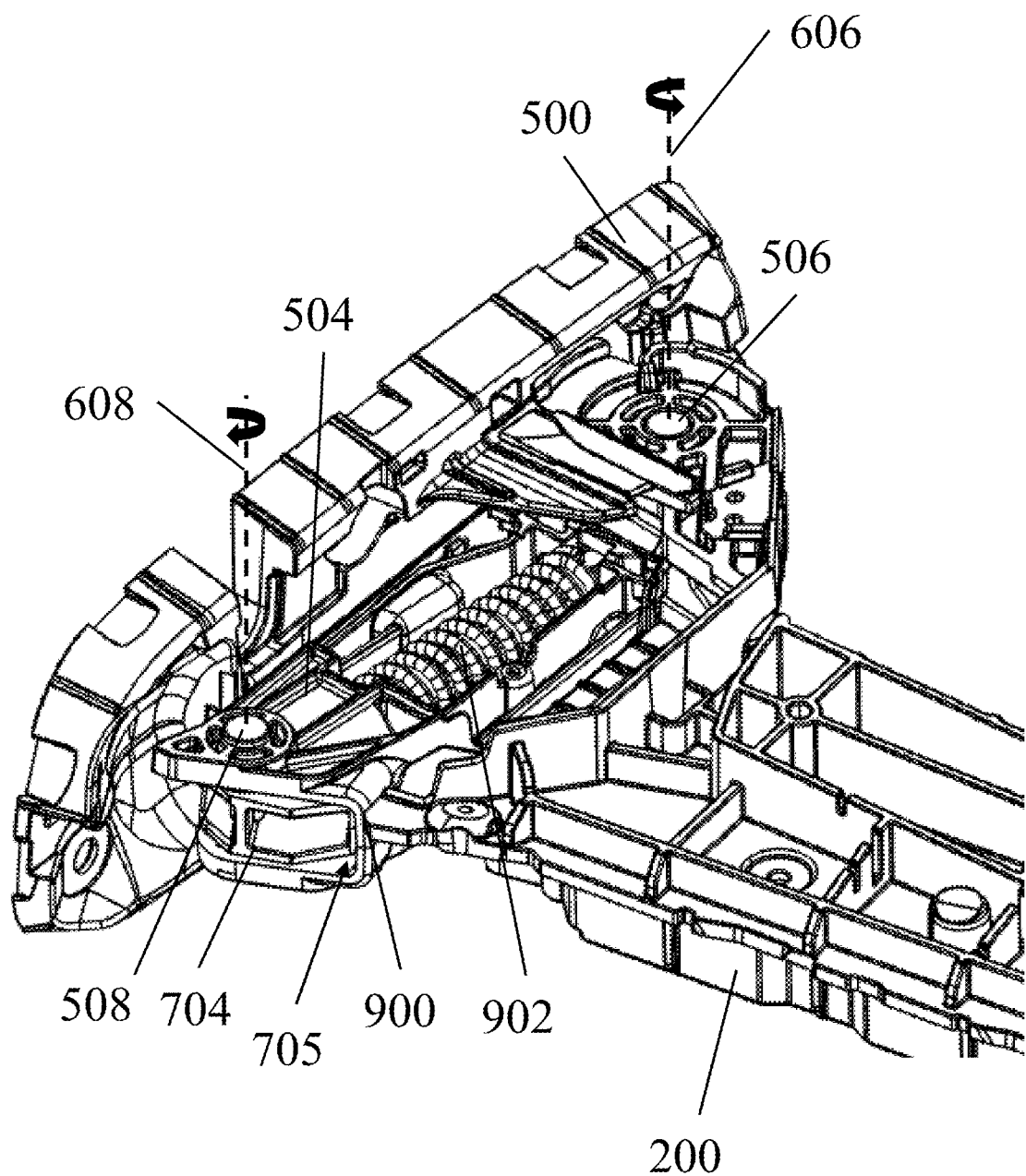
FIG. 16 depicts an isometric view of the folding joint of FIG. 11.
Figure 17:
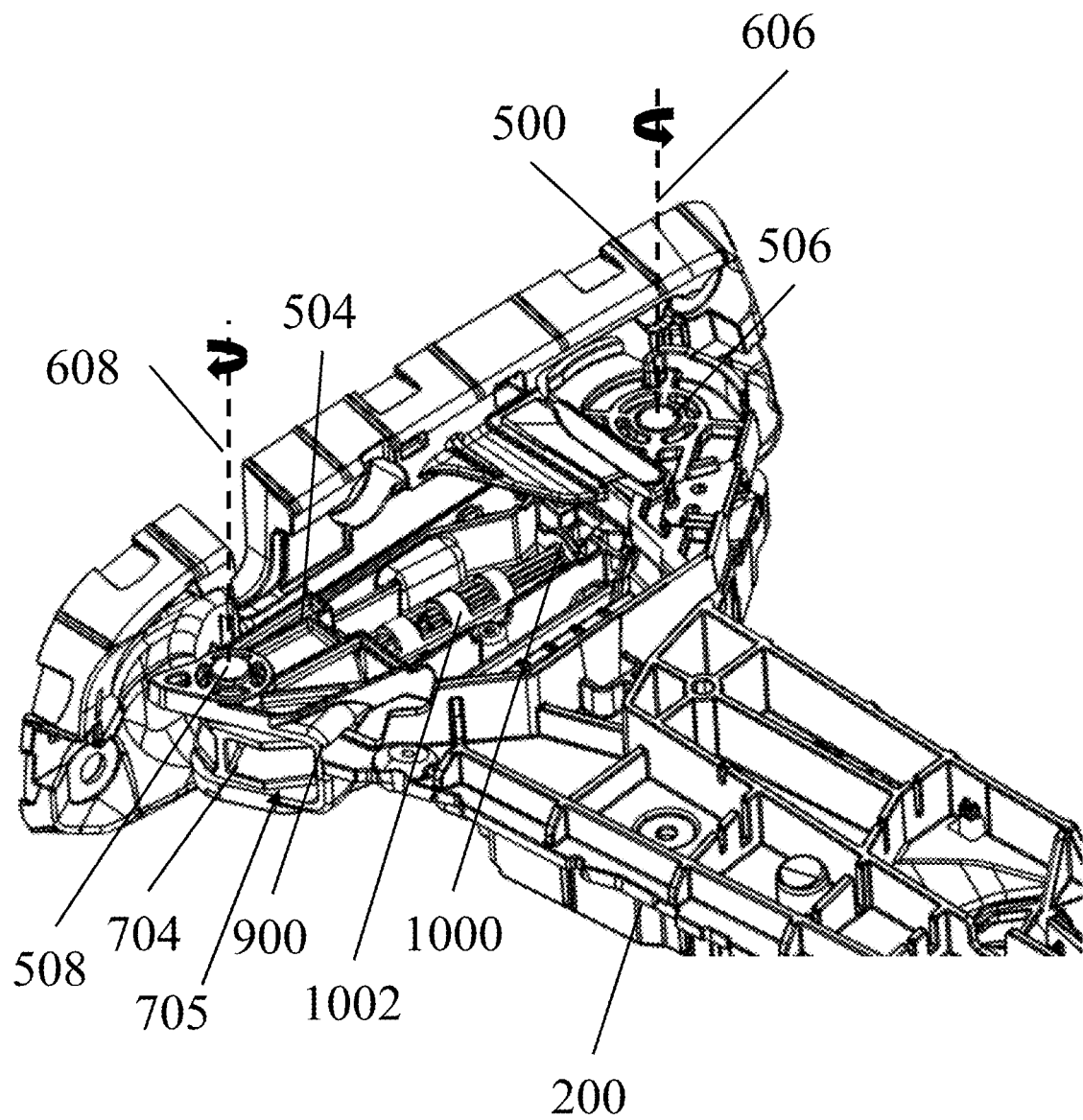
FIG. 17 depicts an isometric view of the folding joint of FIG. 11 without the biasing element.

FIGS. 16 and 17 depict an isometric view of the folding joint of FIG. 11. In FIGS. 16 and 17, a contact point 900 between the arm 200 and the intermediate attachment 504 is shown. The contact point 900 assists in the transfer of vibrations and forces from the arm 200 to the intermediate attachment 504 and ultimately the base 500.

Figure 18:
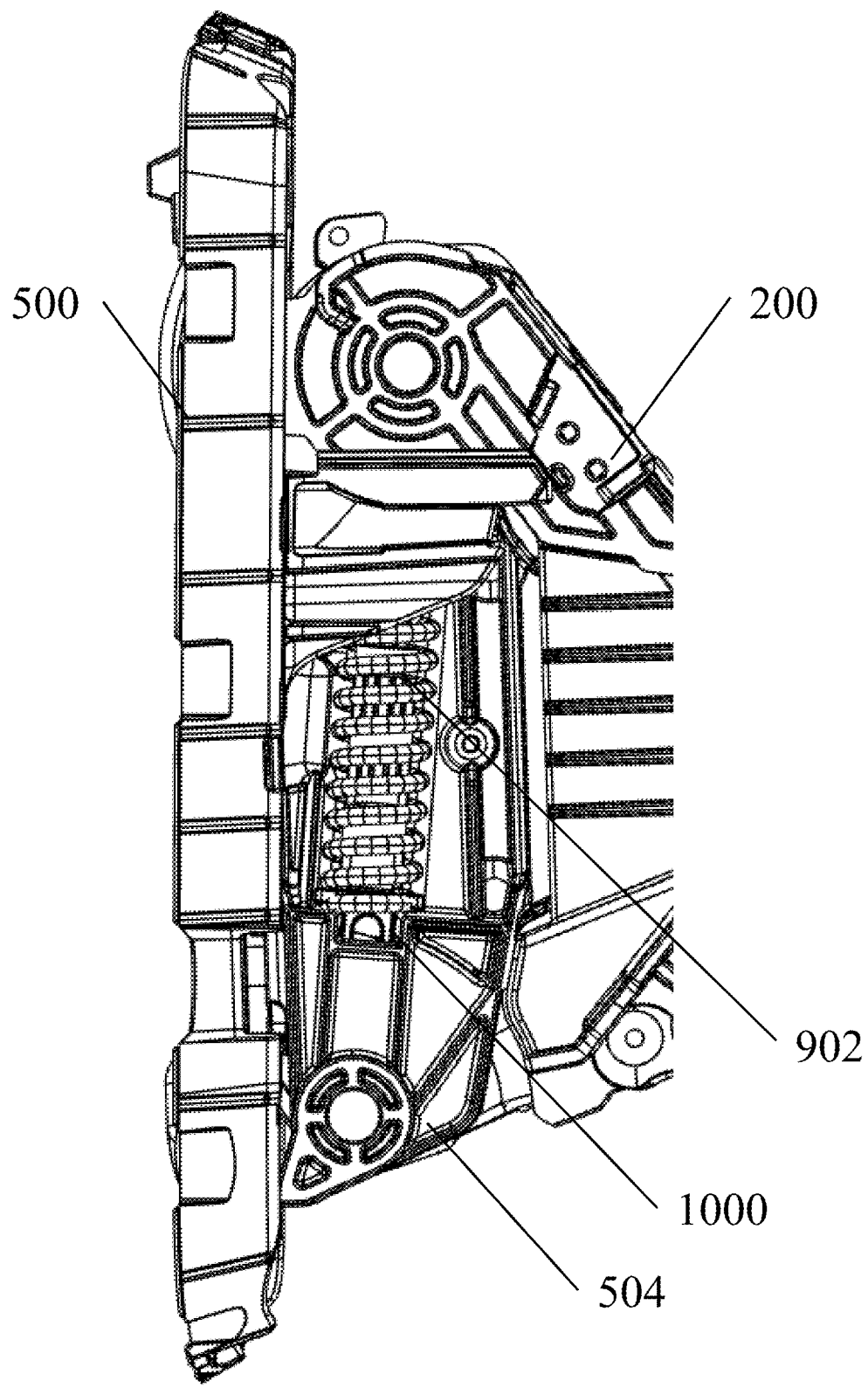
FIG. 18 is a top perspective view of the folding joint of FIG. 11 emphasizing the biasing element.

FIGS. 16 through 19 further shows a biasing element 902 arranged between the arm 200, the base 500, and the intermediate attachment 504. In FIG. 16, the biasing element 902 is depicted as a spring, but could be any biasing element known in the art. The biasing element 902 encases a first biased frame 1000 and a second biased frame 1002, shown in FIG. 17. The first biased frame 1000 is enclosed by the second biased frame 1002, so that the first biased frame 1000 slides within the second biased frame 1002. The first biased frame 1000 and the second biased frame 1002 include shoulder elements that engage either end of the biasing element 902. As seen in FIG. 18, the first biased frame 1000 is held in place by the intermediate attachment 504. In this form, the intermediate attachment 504 includes a cavity to retain a section of the first biased frame 1000 and is situated to ensure the shoulder element of the first biased frame 1000 engages a side wall of the intermediate attachment 504. This ensures the first biased frame 1000 is secured within the intermediate attachment 504. Similarly, the second biased frame 1002 recessed in a cavity of the intermediate attachment 504 and is situated to ensure the shoulder elements of the second biased frame 1002 engages a side wall of the intermediate attachment 504.

Figure 19:
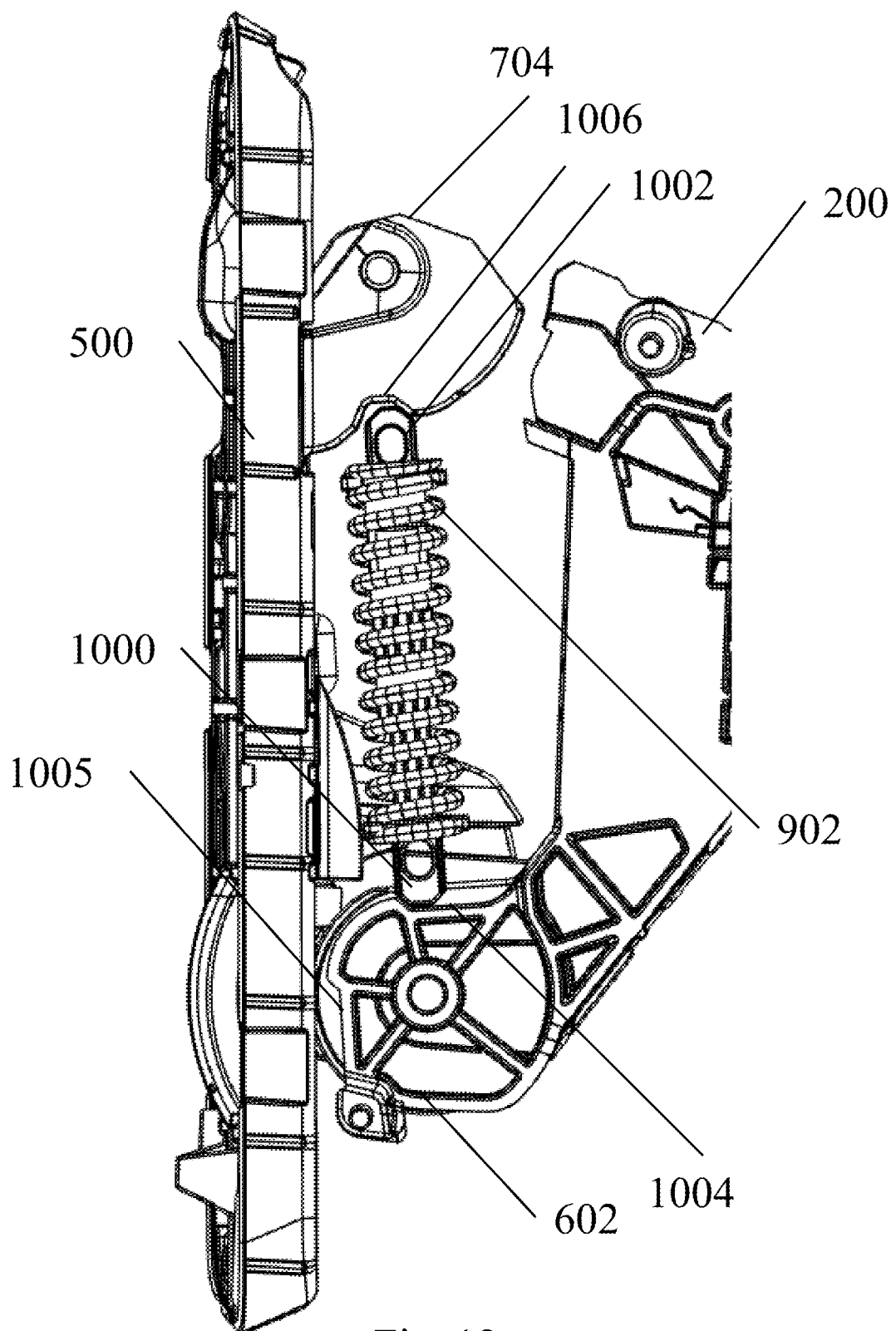
FIG. 19 is a bottom perspective view of the folding joint of FIG. 11.

The first biased frame 1000 cooperates with a first detent 1004 within the second connection member 602 of the arm 200, as seen in the bottom perspective view of FIG. 19. The second connection member 602 provides a cam motion. When the arm 200 is folded forward to pivot about the first axis 606, the first biased frame 1000 encounters a slope leading to a larger diameter area of the second connection member 602, thus pushing the first biased frame 1000 towards the second biased frame 1002 and compressing the biasing element 902.

As the arm 200 pivots about the first axis 606 the first biased frame 1000 transitions from the first detent 1004 to a second detent 1005, thus locking it into the forward folded position. Similarly, the second biased frame 1002 cooperates with a third detent 1006 within the second protruding member 704 of the base 500, seen in FIG. 19. When the intermediate attachment 504 is folded backward to pivot about the second axis 608, the second biased frame 1002 encounters a slope leading to a larger diameter area of the second protruding member 704, thus pushing the second biased frame 1002 towards the first biased frame 1000 and compressing the biasing element 902. When the arm 200 is returned to the active position the first biased frame 1000 and the second biased frame 1002 move away from each other and allow the biasing element 902 to release the tension it held while in a forward folded or backward folded position respectively.

Figure 20:
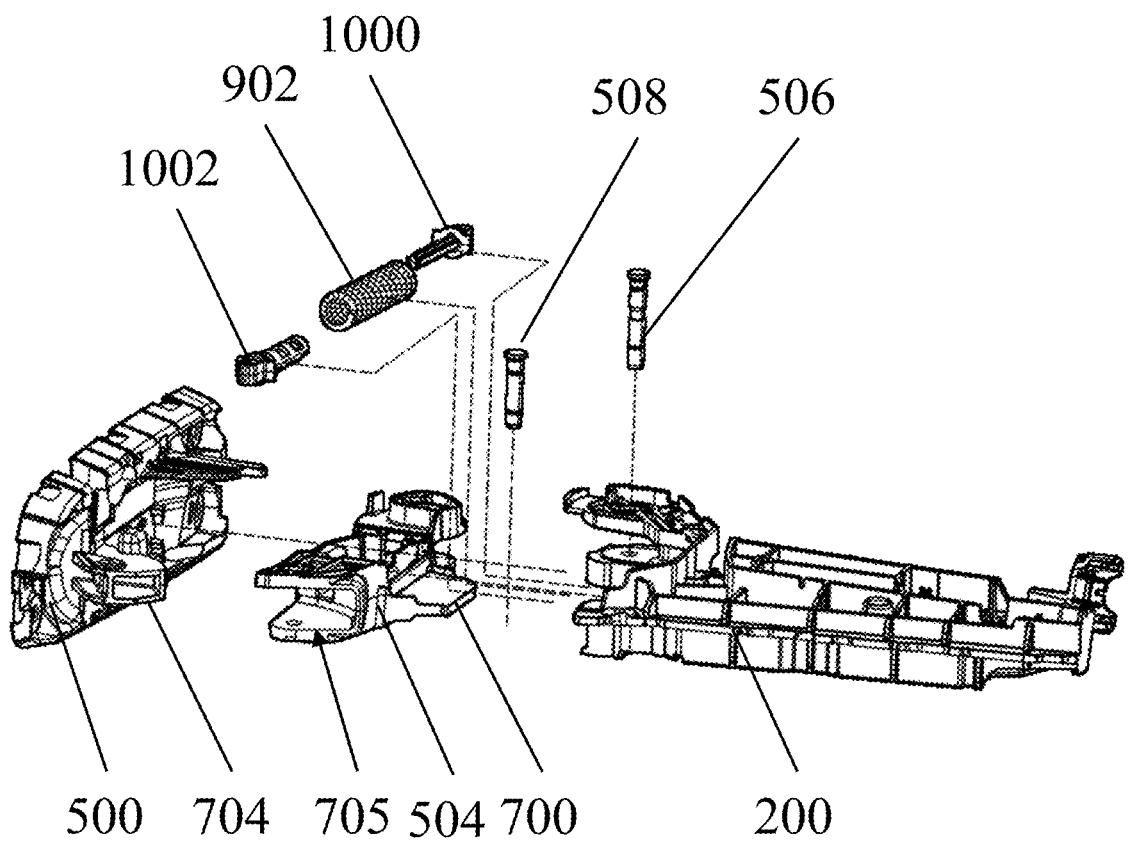
FIG. 20 depicts an exploded view of the folding joint of FIG. 11.

FIG. 20 shows an exploded view of the folding joint of FIG. 11. This view is intended to show the relationship between the various components within the assembly. As shown, and previously stated, the proximal arm end 202 of the arm 200 is pivotably coupled with the intermediate attachment 504 via the first pin 506. The arm 200 includes the first receiving cavity 701 which cooperates with the first protruding member 700 of the intermediate attachment 504. The base 500 contains the second protruding member 704 which cooperates with the second receiving cavity 705 within the intermediate attachment 504. The second protruding member 704 is pivotably coupled to the second receiving cavity 705 via a second pin 508. The biasing element 902 encases the first biased frame 1000 and the second biased frame 1002. The biasing element 902, the first biased frame 1000 and the second biased frame 1002 are then nestled between the arm 200, the base 500, and the intermediate attachment 504.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS 1 folding joint
2 first hinge section
3 second hinge section
3a through hole
4a first opening 4b second opening
5 axis of rotation
6 hinge pin
6a cap
7 guide pin
8 elastic element
9 clamping bolt
10 slot
11 recess
12a-c depression
100 folding joint
120 first hinge section
121 slot
122a-c recess
130 second hinge section
131 channel
150 axis of rotation
180 coil spring
190 clamping bolt
190a+b shoulder
191 cam
210 camera module
400 hinge pin
410 first plate
411a-c recess
420 second plate
430 third plate
450 axis of rotation
480 wave spring
200 arm
201 distal arm end
202 proximal arm end
500 base
501 first end
502 second end
504 intermediate attachment
506 first pin
508 second pin
600 first connection member
602 second connection member
604 first coupling member
605 second coupling member
606 first axis
608 second axis
700 first protruding member
701 first receiving cavity
702 ribbing member
704 second protruding member
705 second receiving cavity
706 top surface
707 bottom surface
800 bracing member
802 support surface
900 contact point
902 biasing element
1000 first biased member
1002 second biased member
1004 first detent
1005 second detent
1006 third detent

What is claimed is:

1. A folding joint for attaching a rear view display device to a vehicle, comprising:
   one or more hinge sections each of which is adapted to rotate relative to the vehicle, with each of the one or more hinge sections comprising a first end and a second end; and
   a biasing element comprising a spring, a coil, a wave spring, or other elastic member for biasing at least one of the one or more hinge sections in response to rotation of the folding joint, with the biasing element biasing at least one of a spring biased cam section or a biased clamping bolt;
   wherein the one or more hinge sections comprise:
   an intermediate attachment, the intermediate attachment comprising a first end and a second end, a first protruding member, and a second receiving cavity;
   a rear view display arm pivotably coupled to the intermediate attachment at a first end to form a first axis, the arm comprising a first receiving cavity to receive the first protruding member; and
   a base pivotably coupled to the intermediate attachment at the second end and forming a second axis, the base comprising a second protruding member that is received by the second receiving cavity.

2. The folding joint of claim 1, wherein the second protruding member of the base is pivotably coupled to the second receiving cavity of the intermediate attachment.

3. The folding joint of claim 1, wherein the first receiving cavity comprises at least one ribbing member engaging the first protruding member when in a first position.

4. The folding joint of claim 3, wherein the at least one ribbing member disengages from the first protruding member when the arm is rotated about the first axis from the first position to a second position.

5. The folding joint of claim 1, wherein the biasing element is arranged at least one of i) between the first and the second end of the intermediate attachment or ii) encasing a first biased member and a second biased member.

6. The folding joint of claim 5, wherein the first biased member and the second biased member cooperate between the second protruding member and the arm.

7. The folding joint of claim 1, wherein a support surface extends from the base, a bracing member extends from the first end of the intermediate attachment, and the support surface and the bracing member cooperate to assist in a transfer of forces from the arm to the base when the arm is rotated about the first axis from a first position to a second position.

8. The folding joint of claim 1, wherein the one or more hinge sections comprise:
   a first hinge section;
   a second hinge section, the first and second hinge sections being adapted to rotate relative to each other around at least one axis of rotation, and
   the folding joint further comprises:
   at least one detent or recessed surface comprising at least two depressions or recesses corresponding to locking positions for adjustably locking a rotational movement of the first and second hinge sections relative to each other;
   a spring biased cam section which is adapted to interact with the at least one detent or recessed surface for adjustably locking the rotational movement of the first and second hinge sections relative to each other;
   at least one hinge pin at least in part coinciding with one of the at least one axis of rotation, each hinge pin being adapted to rotatably connect the first and second hinge sections, and comprising a guide pin extending essentially perpendicularly from the hinge pin; and
   a spring biased clamping bolt arranged on the guide pin.

9. The folding joint of claim 8, wherein the biasing element biases the spring biased cam section.

10. The folding joint of claim 8, wherein the second hinge section comprises at least one slot for accommodating at least part of the first hinge section, or
the first hinge section comprises at least one slot for accommodating at least part of the second hinge section.

11. The folding joint of claim 8, wherein each of the at least two depressions or recesses receive a spring biased cam element of the spring biased cam section to thereby adjustably lock the rotational movement of the first and second hinge sections relative to each other, and comprise an indent having inclined edges for allowing the cam element to glide over the inclined edges and unlock.

12. The folding joint of claim 11, wherein the inclined edges are inclined at an angle of approximately 45°.

13. The folding joint of claim 8, wherein the at least two depressions or recesses of the detent or recessed surface are three depressions or recesses spaced at angular positions around the axis of rotation of approximately −60°, 0°, and 60°, wherein 0° marks a position where the first and second hinge sections are essentially not rotated relative to each other.

14. The folding joint of claim 8, wherein the spring biased clamping bolt provides the spring biased cam section at one end thereof, and another end of the spring biased clamping bolt is telescopically arranged.

15. The folding joint of claim 8, wherein at least one detent or recessed surface is provided by the first hinge section or the second hinge section.

16. The folding joint of claim 8, wherein the guide pin is formed as an integral part with the hinge pin or the guide pin is screwable to the hinge pin, and
at least one of the hinge pin or the guide pin comprises metal material.

17. The folding joint of claim 8, wherein the first hinge section, comprises:
a first opening comprising a through-hole aligned essentially with the axis of rotation, the first opening being adapted to accommodate at least part of the hinge pin; and
a second opening extending essentially perpendicularly from the first opening in the direction of the second hinge section to accommodate at least part of the hinge pin.

18. The folding joint of claim 8, wherein the one end of the spring biased clamping bolt is telescopically arranged on the guide pin so that at least part of the guide pin can be moved relative to the hinge pin.

19. The folding joint of claim 8, wherein the biasing element is at least partly arranged around the guide pin.

20. The folding joint of claim 8, wherein at least one of the spring biased cam section has at least one cam element having a protrusion and edges inclined, or
the spring biased cam section is disposed on an end of the spring biased clamping bolt that is located opposite another end of the spring biased clamping bolt which is arranged on the guide pin.

21. The folding joint of claim 20, wherein the edges are inclined at an angle of approximately 45°.

22. The folding joint of claim 8, wherein the second hinge section comprises a receiving opening comprising a through hole aligned essentially with the axis of rotation for receiving at least part of the hinge pin to rotatably connect the second hinge section to the first hinge section, and the second hinge section comprises a recess around the receiving opening for at least partially enclosing a cap arranged on an end of the hinge pin.

23. The folding joint of claim 22, wherein the second hinge section comprises at least one detent surface extending essentially radially in the slot of the second hinge section, and the detent surface extends at least in part around the axis of rotation.

24. The folding joint of claim 8, wherein the spring biased clamping bolt comprises the cam section with at least one cam at one end, and
the biasing element comprises the spring, the spring being arranged around a part of the spring biased clamping bolt adapted to move the one end.

25. The folding joint of claim 24, wherein the spring biased clamping bolt can at least partly be moved within a channel provided by the first or second hinge section against a force of the biasing element, with the at least one detent or recessed surface being provided by the second or first hinge section, respectively.

26. The folding joint of claim 8, further comprising a first, a second, and a third plate mounted on the hinge pin concentrically around the hinge pin,
wherein the first plate provides the at least one detent or recessed surface, and the second plate provides the spring biased cam section.

27. The folding joint of claim 26, wherein the biasing element comprises the spring, and the spring of the biasing element is arranged between the second plate and a third plate, with the third plate being at least one of arranged concentrically around the hinge pin, fixed relative to the hinge pin, and provided as a cap.

28. The folding joint of claim 1 or 8, wherein each hinge sections comprises plastic material comprising a polyamide material.

29. The folding joint of claim 1 or 8, wherein a first hinge section is adapted to hold the rear view display device, with the rear view display device comprising at least one of a reflective element, a camera module, or a display element.

30. The folding joint of claim 1 or 8, wherein a second hinge section is adapted to attach to the vehicle.

31. The folding joint of claim 1, wherein the arm is pivotably coupled at the first end of the intermediate attachment via a first pin to form the first axis, and the intermediate attachment is pivotably coupled to the base at the second end of the intermediate attachment via a second pin to form the second axis.

32. An external rear view display device for a vehicle with a folding joint of claim 1, wherein a first hinge section is adapted to hold at least one of a reflective element, a camera module and a display element, and
a second hinge section is adapted to attach to the vehicle.

33. A vehicle with two external rear view display devices of claim 32.

* * * * *